United States Patent

[11] 3,532,194

| [72] | Inventor | George W. Jackson |
| | | Dayton, Ohio |
| [21] | Appl. No. | 778,664 |
| [22] | Filed | Nov. 25, 1968 |
| [45] | Patented | Oct. 6, 1970 |
| [73] | Assignee | General Motors Corporation |
| | | Detroit, Michigan |
| | | a corporation of Delaware |

[54] SHOCK ABSORBER WITH VARIABLE DAMPING
2 Claims, 4 Drawing Figs.
[52] U.S. Cl.............................................. 188/299,
188/319
[51] Int. Cl................................................ F16f 9/34
[50] Field of Search.......................... 188/87(A),
88.51, 88.52, 97, 97.1, 100

[56] References Cited
UNITED STATES PATENTS
| 656,232 | 8/1900 | Westinghouse........... | 188/87(A)UX |
| 2,897,613 | 8/1959 | Davidson et al.......... | 188/97.1UX |

FOREIGN PATENTS
| 466,271 | 10/1957 | Italy | 188/88.51 |
| 560,563 | 4/1957 | Italy | 188/87(A)UX |
| 1,006,277 | 4/1957 | Germany | 188/87(A)UX |
| 1,493,830 | 7/1967 | France | 188/97 |

Primary Examiner—George E. A. Halvosa
Attorney—Warren E. Finken and John C. Evans ABSTRACT: In preferred form a hydraulic direct acting shock absorber for automobiles including a normally closed valve in a bypass between its rebound chamber and its reservoir chamber. The bypass valve is connected to a vacuum operator having a spring biased diaphragm that cooperates with a base cup to form a control chamber in communication with a source of vacuum defined by the engine intake manifold. A manually operated control valve is operable to block vacuum from the control chamber to cause the bypass valve to close whereby shock absorber dampening is produced by fluid flow through a valved piston. When the control valve is open, vacuum is connected to the control chamber to open the bypass valve whereby fluid in the shock absorber rebound chamber circumvents the valved piston to reduce dampening.

Patented Oct. 6, 1970

3,532,194

INVENTOR.
George W. Jackson
BY
J. C. Kraus
ATTORNEY 3,532,194

SHOCK ABSORBER WITH VARIABLE DAMPING

DISCLOSURE

This invention relates to a direct acting hydraulic shock absorber having manually operated control means to vary the dampening characteristics of the shock absorber.

When an automobile is driven over rough roads it may be desirable to have more shock absorber dampening than when the vehicle is operated over smooth surfaced highways. In double direct acting hydraulic shock absorbers a piston rod is connected to a piston which is reciprocated in a fluid filled cylinder. Rebound movement produced when the shock absorber piston rod moves exteriorly of the unit causes valving elements and orifices in the piston to restrict fluid flow across the piston and thereby produce a first predetermined dampening action.

One method of decreasing such shock absorber dampening is to bleed hydraulic fluid from the rebound chamber to the reservoir chamber in bypassed relationship to the valved piston of the unit.

In the present invention an orificed bypass extending from the rebound chamber to the reservoir chamber is opened when a manually operated valve on the vehicle dashboard is conditioned to communicate a vacuum operator to intake manifold pressure. The vacuum operator shifts a bypass valve to open the bypass around the piston valving elements and fluid orifices. This imparts less dampening in the shock absorber.

More particularly, the present invention includes a fluid bypass which extends from the shock absorber rebound chamber to the shock absorber reservoir chamber. This fluid bypass is normally blocked by a spring biased valve pin which pin is moved to open the bypass by a vacuum force generated in the automobile engine intake manifold which acts upon one side of a flexible diaphragm attached to the pin when the dash valve is opened. At all automobile speeds the vacuum generated in the intake manifold is of sufficient strength to draw the diaphragm and the attached valve pin against the spring bias to unblock the bypass. However, when the dash valve is closed the vacuum generated in the intake manifold is blocked from the diaphragm and the attached valve pin is spring biased to block the bypass.

The dampening of the shock absorber is lessened when the bypass is opened. Greater dampening occurs when the bypass is closed.

Therefore, an object of the present invention is to provide a novel shock absorber for an automobile which includes means to manually transform the shock absorber from a higher dampening rate to a lower dampening rate by means including a dash mounted, manually operated valve.

A further object of the present invention is to provide a novel shock absorber having a normally closed valve in a fluid bypass between the shock absorber rebound chamber and the shock absorber reservoir chamber which is opened by means including a vacuum operator selectively connected to the intake manifold of an internal combustion engine by a manually operated dash mounted valve when reduced dampening is desired.

Further objects and advantages of the present invention will be apparent from the following description, reference being had to the accompanying drawings wherein a preferred embodiment of the present invention is clearly shown.

IN THE DRAWINGS

Figure 1:
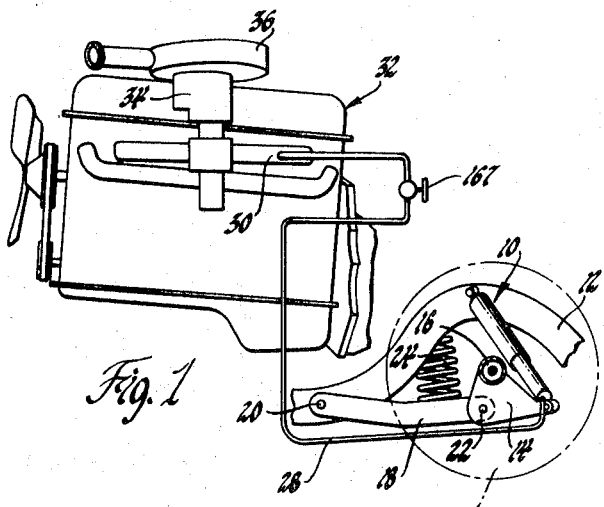
FIG. 1 is a side view of an internal combustion gasoline engine with a vacuum conduit running from the intake manifold to the shock absorber of the present invention which is illustrated between an automobile frame and a rear axle.
Figure 3:
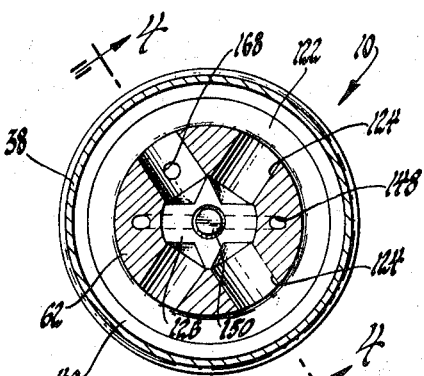
FIG. 3 is a horizontal cross section of a shock absorber assembly taken along section line 3-3 of FIG. 2 looking in the direction of the arrows.
Figure 4:
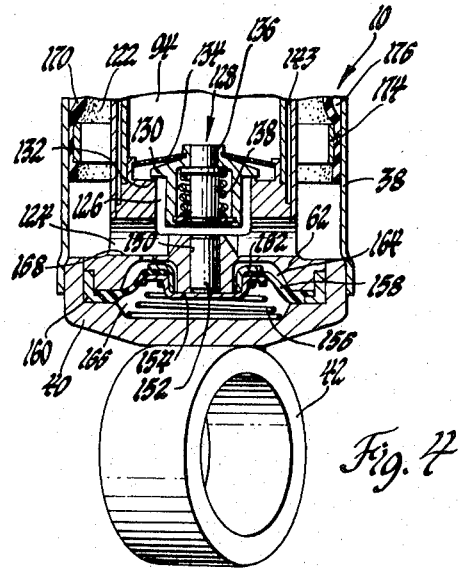
FIG. 4 is a vertical view in cross section of the lower portion of the shock absorber taken along section line 4-4 of FIG. 3 looking in the direction of the arrows.

In FIG. 1 of the drawings, a novel shock absorber 10 of the present invention is illustrated between an automobile frame 12 and a bracket 14 which is secured to the rear axle 16. The bracket 14 on axle 16 is pivotally connected to frame 12 by a control arm 18 which is secured to frame 12 and bracket 14 by pins 20 and 22, respectively. A suspension coil spring 24 is mounted between frame 12 and control arm 18 to resiliently support frame 12 in relation to axle 16. An automobile wheel 26, schematically illustrated, is mounted upon axle 16.

A vacuum conduit 28 extends from shock absorber 10 to the interior of an intake manifold 30 of a conventional automobile gasoline engine which is generally indicated by the numeral 32. Engine 32 includes a carburetor 34 and an attached air cleaner 36 through which atmospheric air passes and is mixed with gasoline vapor prior to entering the engine 32 through intake mainfold 30. It should be noted that engine 32 is of conventional design the details of which form no part of the present invention. It should be also noted that, although only one wheel and its adjacent suspension assembly is shown in FIG. 1, the novel shock absorber assembly of the present invention can be placed adjacent the spring suspension of both rear wheels of the vehicle or at all four wheels of the vehicle.

Figure 2:
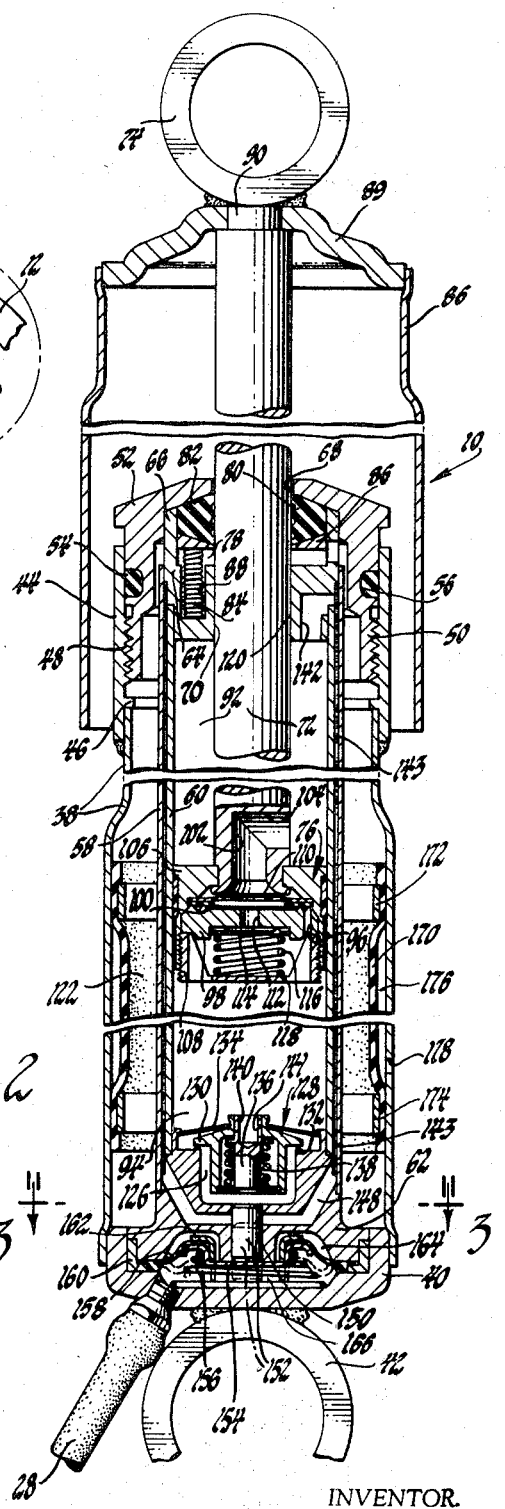
FIG. 2 is a vertical view in cross section of a shock absorber assembly showing the bypass valve mechanism of the invention in a normal position with the bypass blocked.

The shock absorber assembly 10 is more particular shown in FIG. 2, wherein an outer cylindrical reservoir tube 38 with its bottom end enclosed by a base cup 40 is illustrated. The juncture between reservoir tube 38 and base cup 40 is a fluid tight connection. A fitting 42 is attached to the exterior end surface of the base cap 40 by welding or other suitable fastening means and is adapted to secure the shock absorber assembly 10 to bracket 14.

The top end of reservoir tube 38 is attached by welding or other suitable fastening means to a cylindrical collar 44 which fits over the outer end of the reservoir tube 38. Collar 44 has an inwardly directed flange 46 on its internal surface to limit its axial overlap around reservoir tube 38. A radially inwardly projecting band 48 on the interior surface of collar 44 carries threads which engage threaded exterior portion 50 on an inverted cup-shaped end cap 52. An annular gasket 54 is held within a circular groove 56 formed in the outer surface of end cap 52 to form a fluid tight connection between collar 44 and end cap 52.

A bypass tube 58 is concentrically supported within the reservoir tube 38 and a smaller diameter pressure cylinder tube 60 is concentrically supported within the bypass tube 58. An end base 62 concentrically positions the lower end of bypass tube 58 and pressure cylinder tube 60 within the reservoir tube 38 and is itself retained by the base cup 40. An upright cup-shaped rod guide 64 having an upwardly extending circumferentially continuous side 66 concentrically positions and laterally supports the upper ends of the bypass tube 58 and the pressure cylinder tube 60 within reservoir tube 38 and is itself laterally supported and axially retained by the end cap 52.

A reciprocal piston rod 72 concentrically extends within the pressure cylinder tube 60 and through axial bores 68 and 70 within the end cap 52 and the piston rod guide 64, respectively. A top end of the piston rod 72 projects through the end cap 52 and is attached to a fitting 74 by welding or other suitable fastening means exteriorly of the shock absorber assembly 10. Fitting 74 secures the assembly 10 to the automobile frame 12. A valved piston generally indicated by the numeral 76 is supported within pressure cylinder tube 60 and is attached to the lower end of piston rod 72.

Relative movement between the frame 12 and the axle 16 of an automobile causes the interconnected piston rod 72 and piston 76 to reciprocate within the pressure cylinder tube 60. A piston rod seal 80 made of a resilient material such as rubber sealingly surrounds the piston rod 72 and is supported within a seal chamber 78 which is defined within the upwardly projecting side 66 of piston rod guide 64. Seal 80 is axially biased upward against an end face 82 of the end cap 52 by a plurality of coil springs 84 (only one of which is shown) placed in a circular pattern around piston rod 72. Coil springs 84 are compressed between the piston rod guide and an annular seal washer 86 within seal chamber 78 and are laterally supported by mounting them in axially directed bores 88 in the piston rod guide 64. Seal 80 prevents leakage of hydraulic fluid from the shock absorber interior upon reciprocation of the piston rod 72 within the pressure cylinder tube 60.

A cylindrical dust shield 86 surrounds the upper end of the shock absorber assembly 10 to prevent the entrance of dirt and other foreign particles into the seal chamber 78 between bore 68 and piston rod 72. More particularly, dust shield 86 is attached at its upper end to an end cover 89 which is secured to piston rod 72 at a reduced diameter portion 90. Dust shield 86 and end cover 89 move with piston rod 72 in response to relative reciprocal movement between frame 12 and axle 16. In addition to excluding dirt from the shock absorber interior the dust shield 86 also serves to protect the upper end of shock absorber assembly 10 from damage caused by flying objects.

A variable volume rebound chamber 92 is formed within pressure cylinder tube 60 between rod guide 64 and valved piston 76. A variable volume compression chamber 94 is formed within pressure cylinder tube 60 between the cylinder end base 62 and the valved piston 76. Both chambers 92 and 94 are completely filled with hydraulic fluid during normal operation of the shock absorber. Movement of the valved piston 76 within pressure cylinder tube 60 toward rod guide 64 necessarily decreases the volume of the rebound chamber 92. Likewise, movement of the valved piston 76 within the pressure cylinder tube 60 toward cylinder end 62 decreases the volume of the compression chamber 94. Valve components in the piston 76 regulate the flow of hydraulic fluid between chambers 92 and 94 caused by reciprocation of piston 76 within the pressure cylinder tube 60. This regulation of hydraulic fluid flow produces predetermined dampening of relative movement between the frame 12 and the axle 16 of the automobile.

More particularly, hydraulic fluid flows from compression chamber 94 into rebound chamber 92 upon downward movement of piston 76. The fluid path extends through a port 96 within an orifice plate 98, past a spring biased annular valving element 100 and through an axially directed bore 102 and a radially directed bore 104 within piston rod 72 and hence into rebound chamber 92. Orifice plate 98 is axially supported against a piston base 106 by a threaded retainer ring 108 which engages base portion 106.

Upon upward movement of piston 76 within the pressure cylinder tube 60, hydraulic fluid flows from the rebound chamber 92 through bore 104 and bore 102, through a central bore 110 within valving element 100, through a central port 112 within orifice plate 98 and past a valve disk 114 into compression chamber 94. Valve disk 114 is biased in a closed position against orifice plate 98 by a coil spring 116 which extends between a central portion 118 of retaining ring 108 and valve disk 114. For a more detailed explanation of a valved piston of the type found in the preferred embodiment, reference is made to U.S. Pat. No. 3,187,847, it being understood that the details of the valving are merely representative of one fluid control valve arrangement suitable for use in practicing the present invention.

It should be noted that bore 104 in piston rod 72 is positioned a predetermined axial distance above the piston 76 so as to cause the surface 120 formed by bore 70 to cut off fluid flow therethrough when the piston rod 72 is sufficiently withdrawn from the shock absorber interior. This rebound cut off arrangement sharply increases damping at the maximum elongated position and prevents damage by impacting the piston 76 against the piston rod guide 64 at the end of a rebound stroke.

During both rebound and compression strokes, the piston rod volume within tube 60 changes. Because of this volumetric inequality in tube 60, a supplementary quantity of hydraulic fluid must be supplied to the compression chamber 94 upon movement of the piston 76 upward in pressure cylinder tube 60, and means must be provided to accept excess fluid from the compression chamber 94 upon movement of piston 76 downward in pressure cylinder tube 60. An annular fluid filled reservoir chamber 122 defined between the bypass tube 58 and the reservoir tube 38 performs this fluid supply function.

The reservoir chamber 122 which is partially filled with hydraulic fluid communicates with compression chamber 94 through a plurality of radially directed ports 124 formed within the end base 62. Ports 124 extend through the end base 62 from reservoir chamber 122 to a hollow space 126 formed in the upper face of the cylinder end base 62. A base valve assembly 128 is supported within space 126 and its outer circumferential edge 130 is axially biased against an annular valve seat 132. Spring 134 biases the base valve assembly 128 axially downward to attain fluid regulation between space 126 and compression chamber 94.

Hydraulic fluid flow from compression chamber 94 into reservoir chamber 122 is regulated by a base valve plunger 136 which is axially movable against a spring 138 when the fluid pressure within compression chamber 94 exceeds a predetermined value. More particularly, the base valve plunger 136 includes an axially oriented bore 140 with an open end in direct communication with compression chamber 94. A radially extending port 141 through the wall of plunger 136 permits hydraulic fluid from the compression chamber 94 to flow through bore 140 and port 141 into space 126 and hence through bores 124 into reservoir chamber 122 whenever plunger 136 is axially moved downward against spring 138 by a fluid pressure force in compression chamber 94. For a more detailed explanation of the base valve assembly 128 reference is made to U.S. Pat. No. 2,583,169.

In accordance with certain principles of the present invention, change in the responsiveness to bumps of the shock absorber assembly 10 during the rebound stroke is attained by directing hydraulic fluid from rebound chamber 92 into reservoir 122 and compression chamber 94 in bypass relationship to the flowthrough piston 76. More particularly, this fluid pathway includes a port 142 which extends through piston rod guide 64 from the rebound chamber 92 to an annular bypass 143 formed between bypass tube 58 and pressure cylinder tube 60. The fluid flow area of the port 142 is fixed at a value which is dependent on an anticipated loading and the expected rate of cycling for a particular vehicle.

A plurality of relief passageways 148 within the end base 62 extend from the bypass 143 at its lower end to a central bore 150, also within base end 62. Bore 150 extends through base 62 in an axial direction connecting the relief passageways 148 with the space 126 which is directly connected by ports 124 with reservoir chamber 122.

A bypass valve pin 152 which is supported within the bore 150 normally blocks relief passageways 148 and prevents fluid communication between bypass 143 and space 126. Bypass valve pin 152 is reciprocated within bore 150 in an axial direction to open the normally closed relief passageway 148 in response to a vacuum generated by the automobile engine.

Means to move pin 152 within bore 150 includes a cup-shaped member 154 which is attached to the lower end of pin 152. A coil spring 156 compressed between base cup 40 and member 154 maintains the pin 152 in a normal position which blocks passage 148. A flexible diaphragm 158 is secured at an outer circumferential edge to the end base 62 by an outer clamp ring 160 and is secured at an inner edge to member 154 and pin 152 by an inner clamp ring 162. The diaphragm 158 divides a space formed between base cup 40 and end base 62 into a fluid chamber 164 and a vacuum chamber 166.

A vacuum from the intake manifold 30 of the automobile engine 32 is applied through vacuum conduit 28 and vacuum chamber 166 to one side of the diaphragm 158 under control of a dash-mounted on–off valve 167. When the valve 167 is off the shock absorber dampening is established by valves in piston 76 and in valve assembly 128. When valve 167 is open or on the shock absorber dampening will depend on intake manifold vacuum.

Whenever the vacuum within chamber 166 exceeds a predetermined value and the valve 167 is open, a force is exerted on the diaphragm 158 sufficient to cause the attached cup-shaped member 154 to move against spring 156 and draw the pin 152 downward as shown in dotted lines in FIG. 2. Downward movement of pin 152 unblocks the bypass passageway 148 and opens the fluid pathway which extends from rebound chamber 92 through port 142, bypass 143, relief passageway 148, bore 150 into space 126 and around the base valve assembly 128 into compression chamber 94. The vacuum force sufficient to move pin atmospheric unblock the relief passageway 148 is produced by approximately 5 to 6 inches of mercury. This occurs under most driving conditions.

It is essential for the the successful operation of the vacuum actuated diaphragm 158 that chamber 164 remain unpressurized. Thus, a bleed port 168 within the base 62 communicates the reservoir chamber 122 with chamber 164 to thus maintain chamber 164 at the reservoir chamber pressure. Reservoir chamber 122 is maintained at atmospheric pressure by means including a tubular flexible bladder 170 which is sealingly held at its ends against the inner cylindrical surface of reservoir tube 38 by clamp rings 172 and 174. An expansion chamber 176 is formed between flexible bladder 170 and reservoir tube 38 to accommodate expansion of hydraulic fluid within reservoir chamber 122. A bleed hole 178 through reservoir tube 38 allows air within expansion chamber 176 to escape as fluid in chamber 122 expands. By these means expansion of hydraulic fluid within reservoir chamber 122 is accommodated while the reservoir chamber 122 as well as chamber 162 is maintained at atmospheric pressure.

Whenever the valve 167 is closed, no vacuum force is exerted on diaphragm 158 to cause the member 154 and attached pin 152 to move against spring 156. When in an off position, valve 167 vents vaccum chamber 166 to atmosphere thus maintaining pin 152 in its upward position and bleeding vacuum from the chamber 166. This condition may be manually selected by valve 167 when the vehicle is driven on back roads where the road surface is usually rough. At this time a maximum amount of dampening is desirable. With pin 152 in an upward position as shown by solid lines in FIG. 2, maximum fluid dampening is realized by fluid flow solely through valved piston 76. No fluid flows through the bypass 143 and relief passageways 148. Thus, fluid within rebound chamber 92 is unable to flow through the relatively unrestricted passageway 142.

In one working embodiment having a 1 inch diameter pressure cylinder tube and a .077 inch diameter port 142 within the piston rod guide, the following rebound load forces were exhibited for a 4 inch piston stroke:

|  | 25 cycles/sec. | 100 cycles/sec. | 400 cycles/sec. |
| --- | --- | --- | --- |
| Valve 152 closed | 170# | 220# | 428# |
| Valve 152 open | 50# | 190# | 372# |

While the embodiment of the present invention as herein described constitutes a preferred form, it is to be understood that other forms may be adapted.

I claim:

1. A vehicle shock absorber system comprising: a source of pressure; manually operated valve means controlling fluid flow from said source of pressure; a hydraulic direct acting shock absorber including a pressure cylinder tube; piston means concentrically within said pressure cylinder tube; a piston rod attached to said piston means at one end and extending axially outward from said pressure cylinder tube for reciprocating said piston means in said pressure cylinder tube; a cylindrical bypass tube concentrically around said pressure cylinder tube and forming an annular fluid bypass therebetween; a cylindrical reservoir tube concentrically around said bypass tube and forming an annular reservoir chamber therebetween partially filled with hydraulic fluid; a piston rod guide within said pressure cylinder tube and concentrically supporting said piston rod within said pressure cylinder tube; a cylindrical end base member supporting said pressure cylinder tube and said bypass tube within said reservoir tube; a variable volume fluid filled rebound chamber formed within said pressure clyinder tube between said piston means and said rod guide; a variable volume fluid filled compression chamber formed within said pressure cylinder tube between said piston means and said end base member; a port within said rod guide fluidly connecting said rebound chamber and said fluid bypass; a base valve supported on said end base member which regulates fluid flow between said reservoir chamber and said compression chamber; a relief passageway within said end base member fluidly connecting said fluid bypass and said reservoir chamber; pressure actuated valve means supported by said end base member and normally blocking said fluid relief passageway for causing a first predetermined shock absorber dampening action; said pressure actuated valve means including a flexible diaphragm operable to cause movement of said pressure actuated valve means to open the relief passageway; means including said manually operable valve means to direct said source of pressure against said flexible diaphragm to cause movement of said pressure actuated valve means to unblock said relief passageway to allow fluid to flow from said rebound chamber through said bypass and said relief passageway into said reservoir chamber to reduce fluid dampening of movement of said piston rod exteriorly of said pressure cylinder tube.

2. A shock absorber comprising: a pressure cylinder tube; piston means concentrically within the pressure cylinder tube; a piston rod attached to said piston means at one end and extending axially outward from said pressure cylinder tube for reciprocating said piston means in said pressure cylinder tube; a bypass tube concentrically around said pressure cylinder tube and forming an annular fluid bypass therebetween; a reservoir tube concentrically around said bypass tube and forming an annular reservoir chamber therebetween partially filled with hydraulic fluid; a piston rod guide within said pressure cylinder tube and concentrically supporting said piston rod within said pressure cylinder tube; an end base member supporting said pressure cylinder tube and said bypass tube within said reservoir tube; a variable volume fluid filled rebound chamber formed within said pressure cylinder tube between said piston means and said guide means; a variable volume fluid filled compression chamber formed within said pressure cylinder tube between said piston means and said end base member; a port within said rod guide fluidly connecting said rebound chamber and said fluid bypass; a base valve supported on said end base member for regulating fluid flow between said reservoir chamber and said compression chamber; a relief passageway within said end base member fluidly connecting said fluid bypass with said reservoir chamber; a movable valve pin within said end base member and normally blocking said relief passageway for causing a first predetermined shock absorber dampening action; said valve pin movable to unblock said fluid bypass; a flexible diaphragm connected to said valve pin biased to hold said valve pin in a normal position blocking said fluid bypass; said flexible diaphragm having one side adapted to be exposed to a source of pressure to cause movement of the diaphragm and said attached valve pin to unblock said relief passageway thereby to allow fluid to flow from said rebound chamber through said bypass and said relief passageway into said reservoir chamber to reduce fluid dampening of movement of said piston rod exteriorly of said pressure cylinder tube.